Oct. 31, 1950          A. L. LEE          2,527,943
HYDRAULIC VALVE AND SYSTEM
Original Filed April 10, 1944          3 Sheets-Sheet 1
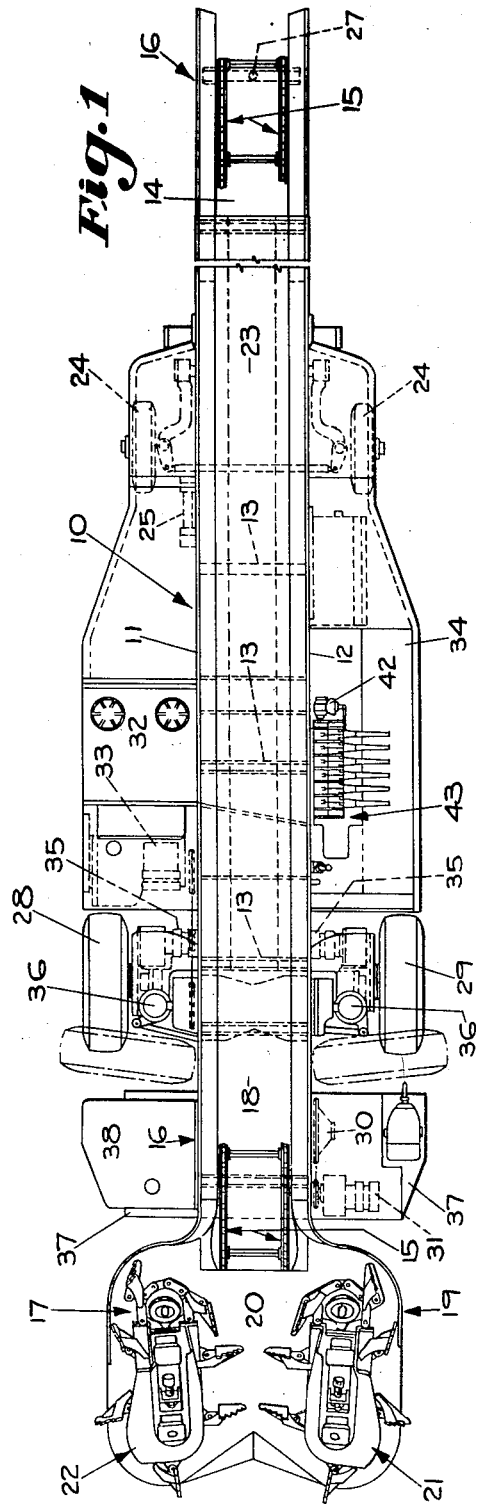
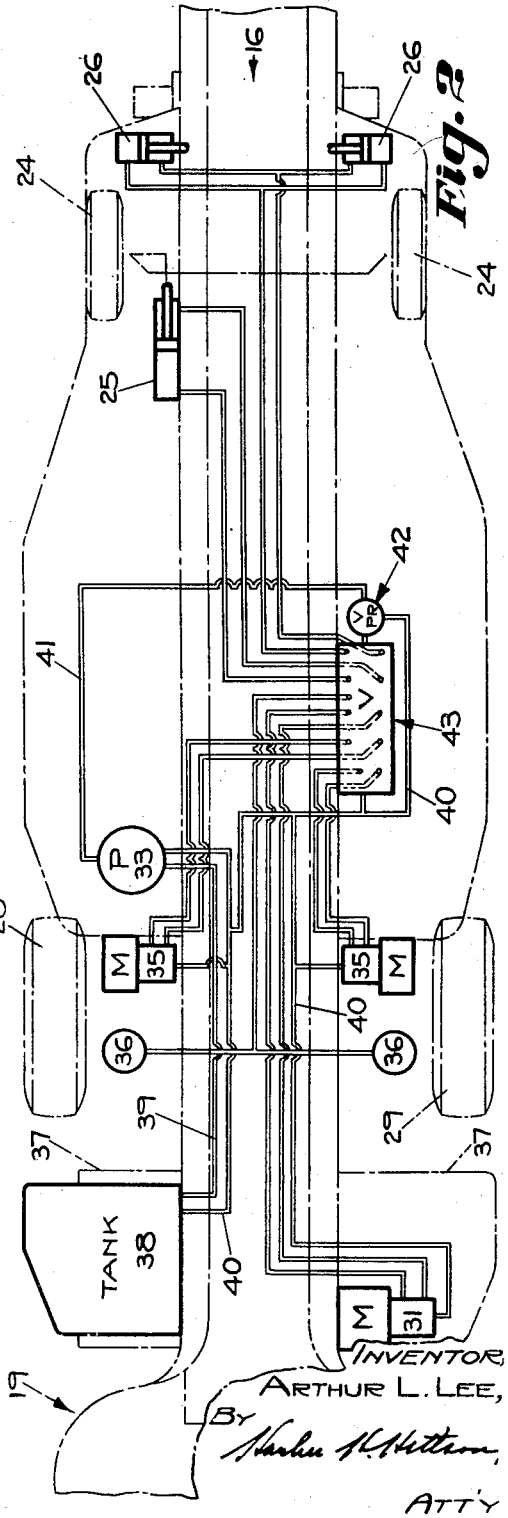
INVENTOR,
ARTHUR L. LEE,
By
ATT'Y

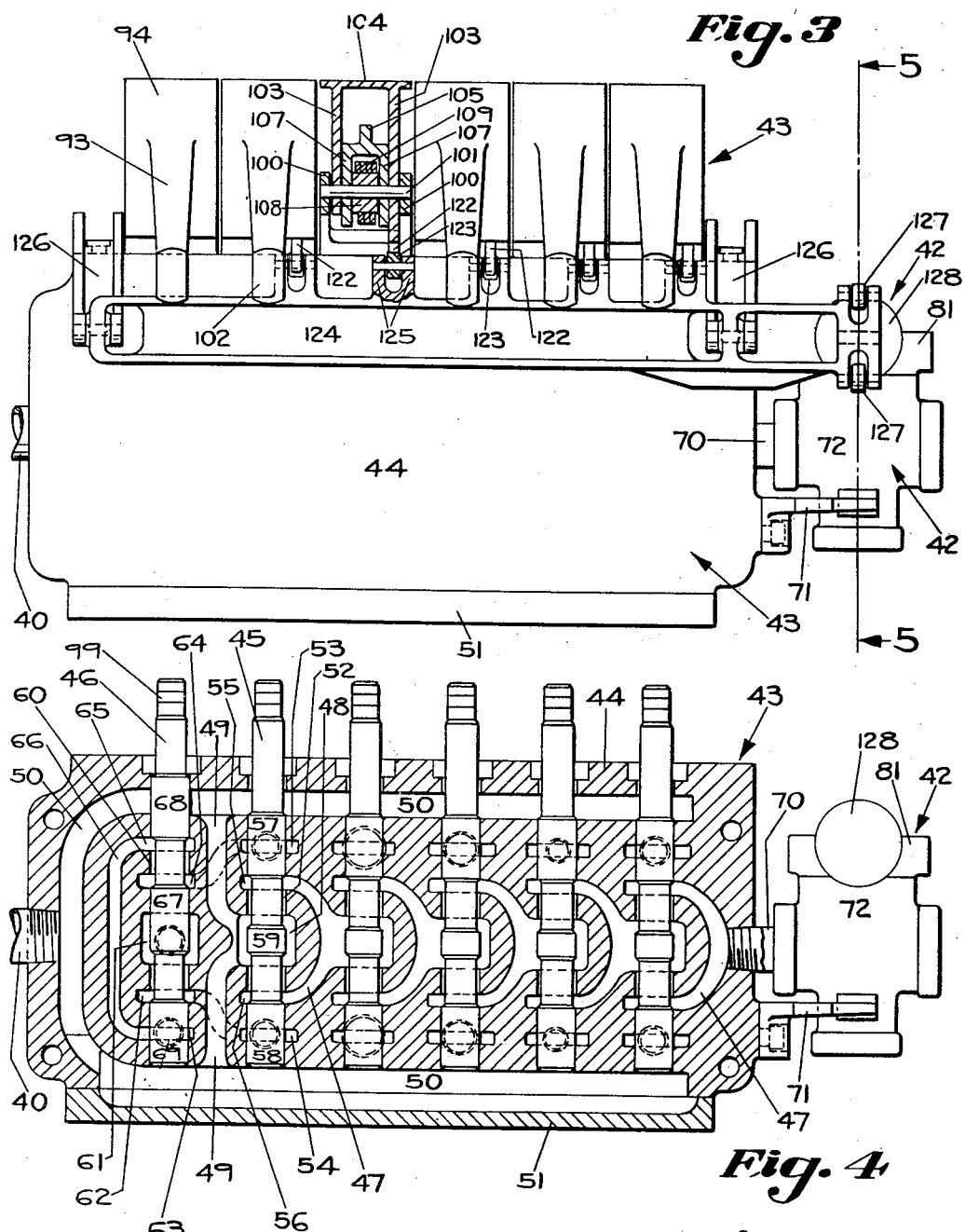

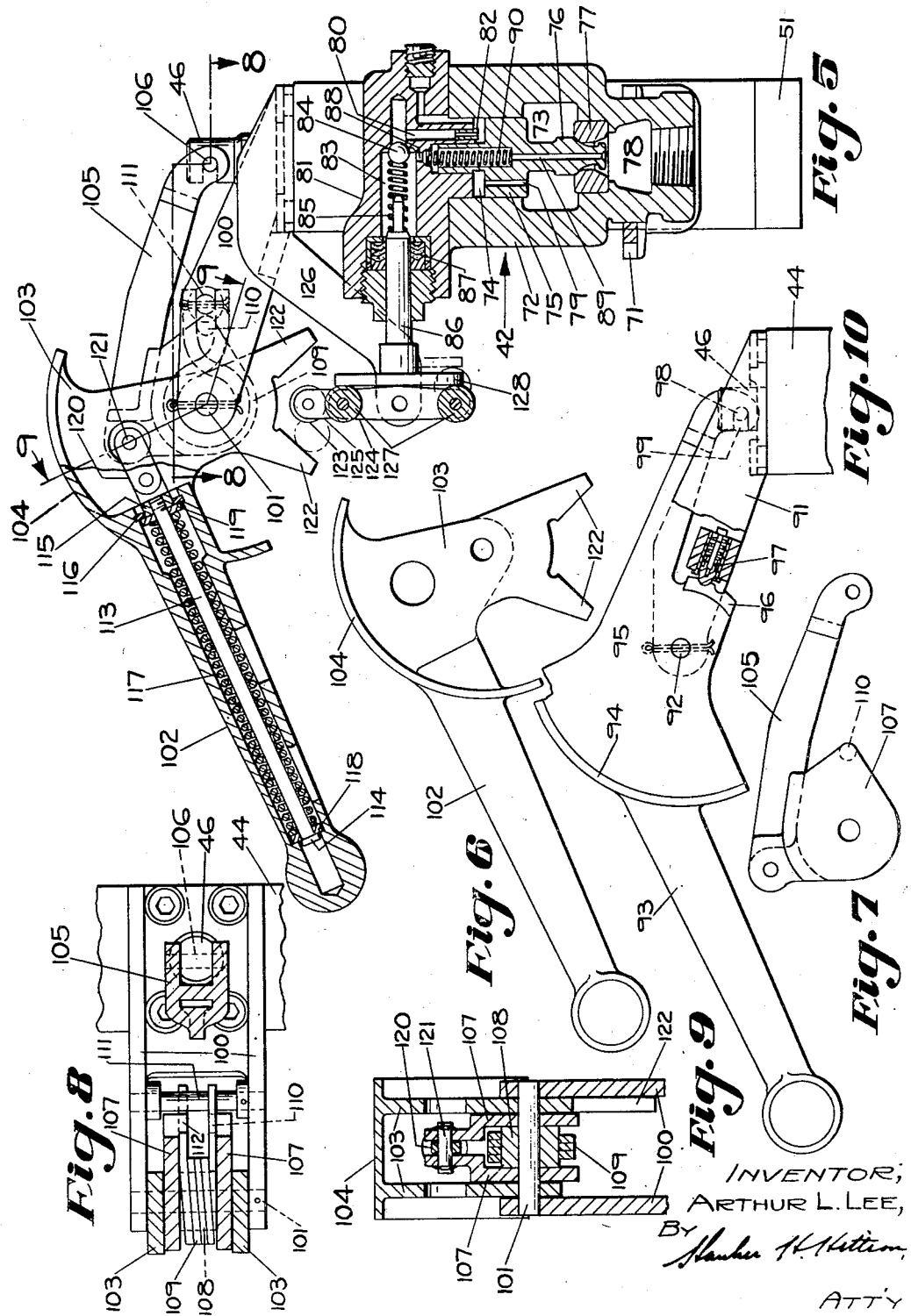

Patented Oct. 31, 1950

2,527,943

UNITED STATES PATENT OFFICE 2,527,943

HYDRAULIC VALVE AND SYSTEM

Arthur L. Lee, Upper Arlington, Ohio, assignor to The Jeffrey Manufacturing Company, a corporation of Ohio Original application April 10, 1944, Serial No. 530,361. Divided and this application December 3, 1947, Serial No. 789,383

5 Claims. (Cl. 60—97)

1

This invention relates to a hydraulic system and valve therefor which while specifically designed for a loading machine are in certain broad aspects equally applicable to vehicles and machines other than loaders.

An object of the invention is to provide a loader including a hydraulic system in which there are hydraulic motors for operating traction wheels, the system providing for reverse operation of the traction wheels in parallel or in tandem relation.

In certain broader aspects, an object of the invention is to provide a hydraulic system capable of operating a pair of hydraulic motors together in a like manner or more specifically in the same direction and also in an unlike manner or more specifically in reverse direction and also preferably to be able to reverse the direction of operation of said motors under both conditions.

A further object of the invention is to provide an improved control valve having control passageways and valve members adapted for use in a system to carry out the function in the first preceding object.

Other objects of the invention will appear hereinafter the novel features and combinations being set forth in the appended claims.

In the accompanying drawings,

Fig. 1 is a plan view of a loading machine embodying my invention;

Fig. 2 is a schematic piping diagram of the hydraulic system of the loading machine;

Fig. 3 is an elevational view of the hydraulic control valve assembly of the hydraulic system with the operating mechanism of one of the valve operating levers shown in section;

Fig. 4 is a sectional elevational view of the bank of valves of Fig. 3 with the pressure control valve shown in elevation;

Fig. 5 is a sectional view taken on the line 5—5 of Fig. 3 showing the pressure valve in section and also showing in section a portion of one of the operating levers;

Fig. 6 is a side elevational view of one of the operating levers of the valve assemblies of Figs. 3 and 5;

Fig. 7 is an elevational view of one of the parts or members of the valve assembly of Figs. 3 and 5;

Fig. 8 is a sectional view taken on the line 8—8 of Fig. 5, looking in the direction of the arrows;

Fig. 9 is a sectional view taken on line 9—9 of Fig. 5 looking in the direction of the arrows; and Fig. 10 is a side elevational view with parts in section showing the operating lever of the last or left hand valve of the valve assembly of Figs.

2

3–5 which has a different function from the other valves.

This application is a division of my co-pending application, Serial No. 530,361, filed April 10, 1944, for a Loading Machine. It is to be understood that the construction and operation of the loader of this application follows that my parent application, above identified, and that only the subject matter pertinent to the present invention is discussed in detail herein.

Briefly described, the loader seen in Fig. 1 of the drawings includes a main frame 10 which includes a pair of spaced apart longitudinally extending upstanding side plates 11 and 12 which are reinforced and held in spaced relation by a plurality of spaced U-shaped brackets indicated at 13 each of which is welded to the side plates 11 and 12. Throughout the major portion of its length, the frame 10 includes in its top and between the upstanding side plates 11 and 12 a pan or trough 14 the side edges of which are welded to the plates 11 and 12 and which constitutes a conveying trough through which coal or other material being conveyed by the loader is scraped by an endless chain flight conveyer mechanism 15.

The main frame 10 to a large extent constitutes a frame of an extensible conveyer 16 that extends throughout the length of the loading machine and of which pan 14 is a part and conveying mechanism 15 constitutes the means for scraping material. The front portion of the extensible conveyer 16 includes a frame, indicated generally by the reference character 17, which telescopes within the main frame 10 and is adapted to be adjusted rectilinearly with respect thereto to increase appreciably the overall effective length of the extensible conveyer 16.

The adjustable frame 17 includes a longitudinally extending column or trough portion 18 which is slidably contained between the side plates 11 and 12 of the main frame 10. Adjacent its forward end the frame 17 is provided with a gathering head 19 including a forwardly and downwardly sloping gathering plate 20 over which coal or other material is gathered from the mine room floor by a pair of endless chain and flight gathering conveyers 21 and 22. The endless conveyer mechanism 15 travels between a head shaft on the gathering head 19 and a foot shaft at the rear end of the main frame 10 and over appropriate guide and drive sprockets on the trough or column 18 and the main frame 10, respectively, in a manner disclosed in full detail in my parent case, Serial No. 530,361, above identified. The construction is such as to permit rectilinear telescopic adjustment of the front frame 17, column or trough 18 and gathering head 19 while providing for a continuous working run of the conveyer mechanism 15 through the trough or pan 14 and an overlapping pan or trough 23 which overlaps said trough 14 and is attached to and reciprocates with the frame 17, the trough 23 forming in effect a continuation of guiding side walls of the trough 18.

The loader is supported on four rubber tired wheels so that it may be transported under its own power from place to place. The four wheels include a pair of rear steering wheels 24 which may be steered by a hydraulic cylinder 25. Said wheels 24 may be raised and lowered together relative to the frame 10 by a pair of double acting hydraulic piston motors 26 which are seen in Fig. 2 of the drawings.

When the machine is performing a loading operation its rear end may be supported for pivotal swinging movement through a ball and socket support, one member 27 of which is attached to the rear end of the main frame 10 adjacent the foot shaft of the conveyer mechanism 15 and the other member of which may be carried by a receiving conveyer in the mine room, not shown, and the wheels 24 will be lifted off the ground by the hydraulic cylinders 26 to provide for swinging of the main frame 10, and thus the complete loader, in a generally horizontal plane on an axis through the member 27. The other two wheels of the conveyer include front supporting and traction wheels 28 and 29 which may be adjusted to parallel positions, as illustrated in full lines in Fig. 1 of the drawings, or they may be adjusted substantially to tandem positions, as illustrated in dotted lines therein, in which tandem positions they are adjusted to swing the loader about the axis of the member 27 so as to position the gathering head 19 opposite coal or other material which is to be loaded by rectilinear frontal attack feeding movement of said gathering head 19.

The front frame 17, as previously stated, is carried for rectilinear sliding movement in the main frame 10 and this movement, by which the gathering head 19 is fed to dig into and load loose or semi-compact coal, is carried out through mechanism which is shown and described in full detail in my parent application, Serial No. 530,361, above identified, by means of a sprocket 30 which is driven through an appropriate driving chain from a reversible rotary hydraulic motor 31 which is provided with built-in speed reducing gearing.

The primary source of power for the various power operated devices on the loader is an electric motor 32 which is mounted on one side of the main frame 10. The rotor or armature shaft of motor 32 drives a hydraulic pump 33 which is the source of hydraulic fluid pressure for the hydraulic system which is illustrated particularly in Fig. 2 of the drawings and it also drives, through suitable clutch and transmission mechanism which is shown and described in my parent application, Serial No. 530,361, above identified, the endless chain and flight conveyer mechanism 15 and the gathering conveyers 21 and 22.

The wheel assembly 28 is on the right hand side of the loader as viewed by an operator seated upon an operator's platform 34 which is carried by the main frame 10 opposite the electric motor 32 and the wheel assembly 29 is on the left hand side. These two wheel assemblies are thus on opposite sides of the main frame 10 and during transportation or rectilinear travel of the vehicle they act to drive it generally in the manner of an ordinary automobile or other power driven steerable vehicle. In other words these two assemblies travel parallel paths and have a common axis of rotation normally transverse to the longitudinal axis of the main frame 10. Wheels 28 and 29 are each driven by a reversible rotary hydraulic motor 35 through reduction gearing. The assemblies which include the wheels 28 and 29 and pivotally mount them to the main frame 10 are interconnected by mechanism, not herein shown, so that the wheels 28 and 29 may be locked in their parallel positions or unlocked to swing together to their tandem positions and be relocked and vice versa. Swinging movement together of the assemblies which include the wheels 28 and 29 may be accomplished by releasing the locking interconnecting mechanism and operating the reversible motors 35 to drive the wheels both in the same direction, the direction depending upon the position to which the wheel assemblies are to be swung, and the interconnecting mechanism is locked when the assemblies reach the desired position. The assemblies which include the wheels 28 and 29 and pivotally mount them to the main frame 10 are also provided with means whereby the wheels may be vertically adjusted with respect to the main frame 10 by piston motors 36 for providing for the vertical adjustment of the elevation of the forward end of the gathering head 19 as well as the pressure thereof on the mine floor when it is resting thereon.

As best seen in Fig. 1 of the drawings, there is a platform 37 adjacent and rigidly attached to the front end of the main frame 10 which extends laterally to both sides thereof. On one side this platform supports the previously described hydraulic motor 31. On the other side of the platform 37 is a tank 38 for hydraulic fluid of the hydraulic system which is preferably oil. Leading from the tank 38 is a feed pipe conduit 39 (Fig. 2) which leads to pump 33. Leading back to the tank 38 is a seepage, by-pass, or return conduit 40, by which hydraulic fluid is returned thereto. The pump 33, of course, produces hydraulic fluid under pressure and delivers it by way of an outlet pipe or conduit 41 to a valve assembly including a variably operable pressure relief valve 42 and a bank of four-way spool valves designated generally by the reference character 43.

As illustrated particularly in Fig. 1 of the drawings the valves 42 and 43 are located adjacent the operator's platform 34 where the individual valves of the bank 43 may be readily operable by an operator on said platform. The hydraulic system as well as the detailed structure of the valves 42 and 43 as elements of the loader and the hydraulic system and the valve 43 per se are important features of my invention. The structures of the valves 42 and 43 will be described in detail hereinafter.

At the moment it is sufficient to point out in connection with Fig. 4 that there are six slide spools in the bank of valves 43. The first spool on the right hand side, as viewed in Figs. 2 and 4, controls the motors or jacks 26 which raise and lower the steering wheels 24 which are connected in parallel over obvious pipes or conduits and by shifting this spool in reverse directions from the neutral, the two motors or jacks 26 may be operated in reverse directions. When said spool is in its neutral position these two motors are locked. The second spool from the right provides equivalent control for the single double acting steering motor or jack 25. The third spool from the right in practice is employed as a three-way valve rather than a four-way valve and it controls the flow of fluid over obvious conduits to the hydraulic piston motors or jacks 36 in parallel which motors or jacks are single acting rather than double acting and are operated for adjusting the elevation of the loader head 19. The fourth spool from the right controls the reversely operable rotary hydraulic motor 31 which feeds the gathering head 19 by adjusting the longitudinally extensible conveyer 16. This is a four-way valve and conduits are provided extending from it to operate the motor 31 in reverse directions. There is also a third conduit extending from the motor 31 which is a branch of the return or relief conduit 40 and thus receives any leakage of the motor 31 and returns it to the tank 38. The fifth and sixth spools of the bank of valves 43, as viewed from the right, co-operate to provide for operation of the two hydraulic motors 35 in parallel so that said motors 35 may be operated to drive their associated wheels 28, 29 either to move the loader rectilinearly in reverse directions or, in other words, with said wheels in parallel when traveling along parallel paths or to operate said motors 35 in parallel to drive said wheels 28, 29 in tandem, in reverse directions. The particular structures of these two spools and associated passageways and conduits will be described in complete detail hereinafter.

It may also be mentioned that leading from each of the motors 35 is a branch of the return conduit 40 so as to take the leakage therefrom. The conduit 40 also extends from the left hand side of the bank of valves 43 and it may be stated that when all of the spools of this valve are in normal condition they provide a no-load by-pass so that the oil can flow freely from the pump 33 to the conduit 40 and back to the tank 38. The conduit 40 also has a branch leading directly to the variably operable pressure relief valve 42.

Attention is now directed to Figs. 3 through 9 of the drawings and to the structures of the variably operable pressure relief valve 42 and the bank of spool valves 43. It may be stated as a prelude to the detailed description of these valves that the pressure relief valve 42 acts not only as a safety valve against excessive pressures in the hydraulic system but that it also has the very important function of adjusting variably and progressively a variable characteristic of the hydraulic fluid and specifically the pressure at which said hydraulic fluid will be discharged when the system is in operation.

The parts are so arranged that by operating a single lever a selected one of the five right hand spools, as viewed in Fig. 4, may be operated first to effect a connection between the hydraulic fluid under pressure and the particular hydraulic motor or motors selected for operation. As the operating handle is further operated after the spool is adjusted the pressure of the fluid which is delivered to the selected motor is progressively increased as the handle is progressively moved beyond the initial position. This is a matter of considerable practical importance particularly in a loading machine as it is applied to operate the head feeding motor 31 or traction wheels 28, 29 or, in other words, to operate the reversible rotary hydraulic motors 35, because the pressure of the hydraulic fluid delivered to these motors determines the torque developed by them. In a loading machine as well as other mining machines and even in machines generally it is often desirable to start the traction wheels or other turning torque developing devices with a low torque and to increase the torque progressively if necessary to do the intended work. This makes for a very smooth operation together with safety. The operator may not have excessive torque in starting the operation but if greater torque is needed than that when the operation is started it is readily available.

Referring first to the details of the bank of valves 43, as seen in Figs. 3 and 4, this bank includes a main body or casting 44 provided with six vertical bores which receive the six spools, only the last two of which will be described in detail and which are designated by the reference characters 45 and 46. As clearly illustrated in the drawings, hydraulic fluid delivered from the pressure relief valve 42 to the valve bank 43 is delivered to a central two-arm passageway 47 and with all the spools in neutral positions this passageway extends by duplicated individual steps through the main body 44 until it is dumped from the central chamber 48 adjacent the spool 45 by way of parallel passageways 49 which dump into parallel top and bottom tank or drain passageways 50, both of which are common to the tops and bottoms of all of the spools. These two passageways 50 are interconnected adjacent the right hand end of the body or casting 44 and are directly connected with the previously mentioned drain conduit or pipe 40. The bottom passageway 50 is formed in part in a removable bottom plate 51 which is removably attached as by machine screws (not shown) to the casting 44 and may be considered as forming a part of said body 44. The spool 45 extends into one of the previously mentioned bores in the casting 44 which is designated by the reference character 52. This bore is of substantially uniform diameter throughout its entire length from the top of the casting 44 into the bottom passageway 50. Co-operating with the bore 52 are top and bottom motor chambers or ports 53 and 54, respectively, which are connected with the conduits leading to the upper hydraulic motor 35, as viewed in Fig. 2 of the drawings. The bifurcated central passageway 47 associated with the bore 52 is similar in construction to all the others to the right thereof in said casting 44 and it terminates in upper and lower chambers or ports 55 and 56, respectively.

The spool 45 is provided with an upper land or barrel 57, a lower land or barrel 58 and a central or intermediate land or barrel 59, said spool 45 being of reduced diameter between land or barrel 59 and the other two lands or barrels 57 and 58, as clearly illustrated in Fig. 4 of the drawings.

The spool 46 extends into a uniform bore 60 in the casting 44 and this bore and associated ports and passageways as well as spool 46 are of different structure from the spool 45 and bore 52 which in general is substantially the same as each of the other spools and bores, respectively, of the bank of valves 43. This difference is because of an entirely different function performed by the valve 46, 60. It may be stated that the function of the valve 46, 60 is to control that portion of the hydraulic circuit individual to the two hydraulic motors 35 so that the wheels 28, 29 will rotate selectively either in parallel or, in other words, along parallel paths or in tandem for the purposes previously described.

In certain broader aspects of the invention it may be considered that the valve 46, 60 provides for the operation of the two motors 35 selectively so that they operate either in a like or similar manner or in an unlike or dissimilar manner or, in other words, so that they rotate selectively in the same directions, that is, both clockwise or both counter-clockwise or in opposite directions, that is, either one clockwise while the other rotates counter-clockwise.

The valve 45, 52 operates in conjunction with the valve 46, 60 so that the two motors 35 considered together may be reversely operated regardless of whether the wheels are rotating in tandem or in parallel or, in other words, regardless of whether the motors are operating in a like or in an unlike manner.

Adjacent the central portion of the bore 60 is a chamber or port 61 and unlike the somewhat similar chamber or port 48 chamber 61 is connected by a pipe or conduit directly to one of the motors 35. In other words, it is connected to one of the two pipes at the side of lower motor 35, as viewed in Fig. 2 of the drawings. Below the chamber or port 61 is a chamber or port 62 which, of course, like chamber 61 communicates with the bore 60 and is connected by a passageway to the motor chamber or port 54 of valve 45, 52. Also communicating with the bore 60 and positioned below chamber or port 62 is a chamber or port 63 which connects with the other pipe or conduit leading to the side of the lower motor 35, as seen in Fig. 2 of the drawings. Directly above the chamber 61 is a chamber or port 64 in communication with the bore 60 which chamber 64 is connected by a passageway to the previously described top motor chamber 53. Directly above the chamber 64 and communicating with the bore 60 is another motor chamber or port 65 which is connected by a passageway 66 to the previously described motor chamber 63.

The valve spool 46 has three lands or barrels including central land or barrel 67, upper land or barrel 68 and lower land or barrel 69.

The spool 45 like all of the other spools to the right of it, as viewed in Fig. 4, is a three-position spool and each of these spools is shown in its normal or neutral position which provides a no-load by-pass through passageways 47 and to the central chambers of each, similar to the central chamber 48, by virtue of the fact that the central lands or barrels similar to that at 59 of spool 45 are relatively short in length and the reduced portion of each of said valve spools similar to spool 45 provides an obvious passageway between the upper and lower arms of successive passageways 47 into the successive central chambers similar to that at 48. As previously described, chamber 48 dumps directly to the tank or drain passageways 50 by way of passageways 49.

Assuming that the valve spool 46 is in the position illustrated which is one of its normal positions and the valve spool 45 is shifted upwardly, the hydraulic fluid delivered to the upper arm of the associated passageway 47 will be directed by the lands 57 and 59 to the motor port 53. The hydraulic fluid under pressure will thus flow through the conduit which is connected with motor port 53 to the upper motor 35 of Fig. 2, the return fluid from said upper motor 35 returning to the lower motor port 54 which under these conditions communicates with the lower tank or drain passageway 50 by way of the lower portion of bore 52. This will, of course, cause rotation of the upper motor 35 of Fig. 2 in a predetermined direction. The pressure of this hydraulic fluid and thus the torque developed by said motor 35 may be progressively adjusted in a manner hereinafter described.

The lower hydraulic motor 35 of Fig. 2 is also connected in parallel with the upper motor 35 and the parts are so connected that with the valve spool 46 in the position illustrated, the two motors 35 will rotate their associated wheels 28, 29 along parallel paths. The hydraulic path by which these two motors 35 are connected in parallel is provided by virtue of the fact that motor port 53 is always connected to previously described port 64 associated with spool 46 and with said spool 46 in the position illustrated in Fig. 4 this hydraulic path or passageway extends from chamber 64 through bore 60 to chamber 65, then through passageway 66 to motor port 63 which is connected with one of the conduits of lower motor 35 of Fig. 2, as previously described.

The other conduit of said lower motor 35 extends as above described to its port 61 which is now connected through bore 60 to chamber 62 which is permanently connected to the motor chamber 54 which under the assumed conditions (with spool 45 lifted) is connected with lower drain or tank passageway 50, as above described. In other words, the two hydraulic motors 35 are hydraulically connected in parallel under the assumed conditions and these two motors drive their associated wheels 28, 29 along parallel paths to move the vehicle forwardly. Under such conditions, considering each of the motors individually, one of them rotates in a clockwise direction and the other in a counter-clockwise direction when viewed from directly in front of each wheel driven by the particular motor.

If the valve spool 45 is returned to its neutral position, as illustrated in Fig. 4, the two motors 35 will be locked against rotation in either direction. If said spool 45 is then moved downwardly the two motors 35 will reverse their directions of rotation, driving the wheels 28, 29 along parallel paths to reverse the direction of travel of the vehicle. It is believed the circuits created are obvious since under these conditions motor port 54 is connected to the pressure passageway 47 and motor port 53 is connected to upper drain passageway 50.

It will be seen that when the wheels 28, 29 are in their tandem position that because each of them has been swung forwardly in opposite directions about their respective perpendicular spaced axes that the direction of operation of one of the wheels and consequently its driving motor 35 must be reversed with respect to the other to swing the loader about its axis of the mounting member 27 so that the driving action of the wheel 28 will not oppose the driving action of the wheel 29 and vice versa. Accordingly when the spool 46 is moved downwardly from the position illustrated in Fig. 4, the relative direction of rotation of the two motors 35 is reversed from that just described. This is the arrangement of the valves employed when the wheels 28, 29 are in their tandem position indicated in dotted lines in Fig. 1 and it is desired to swing the loader in either of the two reverse directions. The effect of the adjustment of the spool 46 hydraulically is to shift the previous connection of the motor chambers 53 and 63 in parallel and the motor chambers 54 and 61 in parallel to one in which a reverse direction exists and motor chamber 53 is connected in parallel with motor chamber 61 and motor chamber 54 is connected in parallel with motor chamber 63. This is effected in a manner which is believed evident in that by moving spool 46 downwardly the restricted portion between lands 57 and 59 will interconnect chambers 62 and 63 while the restricted portion between lands 67 and 68 will interconnect chambers 64 and 61.

It is, of course, obvious that when the wheels 28, 29 are in their tandem positions, as shown in Fig. 2 in dotted lines, and the valve 46 is adjusted so as to operate them in this position, they may be driven in reverse directions. The two motors 35 under these conditions, while reversible together, each operate in a similar manner or in the same direction such as a clockwise direction or a counter-clockwise direction.

It is thus evident that I have produced a novel combination of valves as well as a novel hydraulic system and in addition a novel combination of parts in a loading machine or the like which provides for extreme flexibility of operation with a pair of hydraulic motors to perform different functions.

It may be further mentioned that adjacent the top of each of the spools illustrated in Fig. 4 of the drawings there is a hydraulic seal (not shown) preventing leakage of fluid from the casting 44.

Attention is now directed particularly to Figs. 3 and 5 of the drawings and to the structure of the pressure control valve 42. As illustrated in Fig. 3, the valve 42 is mounted on a short pipe 70 threaded into the casting 44 which pipe directs hydraulic fluid to the first passageway 47 (Fig. 4). This pipe 70 physically supports the valve 42 from the valve tank 43. To prevent turning movement of the valve 42 a bracket 71 has an arm which extends in front of the bottom portion of valve 42 and is attached by a pair of screws to the casting 44. Removal of the bracket 71 will permit screw threaded removal of the valve 42. Said valve 42 comprises a main body or casting 72 which is provided with a screw threaded inlet port on the right hand side, as viewed in Figs. 3 and 4, which is connected to the conduit 41 (Fig. 2) leading from pump 33 and which communicates with a central chamber 73 formed in the casting 72. From the chamber 73 the hydraulic fluid under pressure communicates directly with the pipe 70 and is thus fed to the passageway 47. As previously mentioned, the function of the valve 42 is to control the pressure of the hydraulic fluid delivered to the hydraulic motors, or, in other words, delivered to the bank of valves 43. To this end there is an upright cylindrical bore 74 which receives a piston 75 having at its bottom an integrally formed by-pass valve cone 76 adapted to co-operate with a seat ring 77 to control the amount of fluid which is discharged from the chamber 73 through the bottom discharge chamber or port 78 which is directed to the drain pipe 40, illustrated in Fig. 2 of the drawings. The pressure of the hydraulic fluid in the chamber 73 is controlled by the size of the by-pass opening provided by the by-pass valve 76—77 and in operation the piston 75 will float under the control of the hydraulic fluid in a manner adjusted by the operator to maintain a hydraulic pressure in chamber 73 at any value from substantially zero to a very high value such as 1200 pounds per square inch or even higher, if desired. In other words, just enough hydraulic fluid is by-passed from chamber 73 to maintain any selected pressure therein and the value may be adjusted over the range indicated. This, of course, has the inherent feature of acting as a high pressure relief valve for the hydraulic system. To effect this automatic but adjustable control, the piston 75 is provided with a very small bore 79 which extends completely through it so that the hydraulic fluid under pressure in the chamber 73 will flow through the bore 79 and be present in the bore 74 above said piston 75. As a consequence the only pressure difference between the top and bottom of the piston 75 will be the pressure drop through the bore 79 which will be a function of the flow rate therethrough. The pressure in the bore 74 above the piston 75 is transferred upwardly by the hydraulic fluid through a bore 80 formed in a removable cap or head 81 attached to the casting or body 72 by machine screws (not shown). A constriction member 82 is placed in the bore 80 so that in case of a fluid flow through said bore 80 it will produce a pressure drop, dependent upon the rate of such fluid flow.

Bore 80 has a horizontal as well as a vertical portion, the horizontal portion of which provides a discharge port into a chamber 83 which is controlled by a ball 84, thus providing a ball check valve. The ball 84 is compressed by a spring 85 in a valve closing direction. The tension of spring 85 is variably adjustable by a reciprocally adjustable plunger 86 mounted in the head 81 and extending through stuffing box 87. Adjustment of the plunger 86 will adjust the tension of the spring 85 and consequently adjust the pressure necessary to unseat the ball 84 which determines the pressure of the hydraulic fluid in the main chamber 73 of the pressure control valve 42. Mechanism by which the plunger 86 is adjusted is described in detail hereinafter.

Whenever the pressure in the bore 80 is sufficient to unseat the ball 84, it is obvious that hydraulic fluid under this pressure will flow into the chamber 83. Said hydraulic fluid in chamber 83 is free to discharge into the by-pass chamber or port 78 through an open port 88 formed in the bottom of chamber 83 which communicates with a central bore 89 in the piston 75 over an obvious passageway in which is a fairly light spring 90 which urges the piston 75 downwardly and thus urges the by-pass valve 76—77 into valve closing position.

The operation of the pressure relief valve 42 is as follows: Assuming that the spring 85 is tensioned so that the ball 84 will open at a pressure of 500 pounds per square inch, as long as the pressure in chamber 73 is below 500 pounds the ball 84 will remain seated and consequently there will be no fluid flow into chamber 83. Because of this fact there will be no fluid flow through bores 79 or 80 or through constriction 82. Consequently the pressure on opposite sides of the piston 75 will be equalized and the spring 90 will maintain the by-pass valve 76—77 closed. Should the pressure in chamber 73 exceed 500 pounds per square inch, ball 84 will be unseated and there will be a flow of hydraulic fluid into the chamber 83 and through port 88 and bore 89 to the by-pass chamber 78. This flow of fluid will create a pressure drop through restricted bore 79 so that the pressure on the bottom thereof will be greater than the pressure on top. As a consequence the by-pass valve 76—77 will unseat in response to a lifting of the piston 75 and sufficient hydraulic fluid will be by-passed from chamber 73 to reduce the pressure therein.

Under normal operating conditions, the valve 42 will operate with the piston 75 in a floating condition by-passing just enough hydraulic fluid to maintain the preselected pressure in the main chamber 73.

It is obvious that by adjusting the plunger 86 and thus the compression of spring 85, this pressure may be varied progressively and continuously from any desired minimum to a maximum value. It is thus evident that the characteristic of the hydraulic fluid which is controlled by the valve 42 is its pressure characteristic. Within certain broad aspects of my invention some other characteristic of the hydraulic fluid such as the rate of fluid flow might be controlled by said characteristic control valve 42. However, in the instant invention since it is the torque of the motors and particularly the motors 21 and 35 which are to be controlled, it is the pressure characteristic of the hydraulic fluid which is so controlled. The above described feature is claimed in my divisional application, Serial No. 169,858, filed June 23, 1950.

As previously suggested, the operating mechanism for the first valve spools counting from the right, as viewed in Fig. 4 of the drawings, is reproduced except for certain common operating mechanism, but the operating mechanism for the spool 46 is entirely independent of the others. It will be described first and is illustrated in detail in Fig. 10 of the drawings.

Mounted on the left hand end of the casting 44, as viewed in Fig. 3, is a bifurcated bracket 91 (see Fig. 10) the two spaced arms of which extend forwardly and carry a pivot pin 92. Pivotally mounted on the pivot pin 92 is an operating handle 93 which extends forwardly and downwardly in either of its positions of adjustment and which at its upper end terminates in an arcuate plate 94. Extending to the right of the arcuate plate 94, as viewed in Fig. 10, the handle has an integral plate and arm 95 whch is located inside the two arms of the bracket 91 and has a hole providing pivotal connection with the above mentioned pivot pin 92. The plate 95 carries a hardened segment 96 formed integral therewith which is provided with a pair of spaced notches adapted to receive selectively a spring pressed detent 97 carried between the spaced arms of bracket 91.

As previously mentioned, the spool 46 has only two positions and so the detent and notches in the segment 96 co-operate to locate it properly in either of these two positions. The upper arm of the plate 95 extends in a downwardly sloping direction and carries a pivot pin 98 in its forward bifurcated end which has a sliding contact with a transverse notch 99 formed in the upper end of the spool 46. It is thus manifest that up and down or swinging movement of the handle 93 will produce up and down adjustment of the piston or spool 46.

The other five sliding spools including spool 45 are provided with similar operating handles which differ materially from that just described since they are moved not only to shift the spools but to operate after the spools have been shifted from their neutral positions in either of the two reverse directions to adjust the pressure control or relief valve 42 and thus adjust the pressure of the hydraulic fluid delivered to the selected motor or motor whose control valve is actuated. The structures of these operating levers will be seen particularly by reference to Figs. 3, 5, 6, 7, 8 and 9 of the drawings.

Adjacent each spool such as spool 45 there is a bracket 100 having a pair of spaced arms, which bracket is attached by screws to the main casting 44 (see Fig. 8). Extending between the arms of said bracket 100 is a pivot pin 101 upon which is pivotally mounted an operating handle 102 by means of a pair of spaced upright webs 103 formed integral therewith and also integral with an arcuate plate 104. Also pivotally mounted on the pin 101 is a forwardly extending downwardly sloping operating lever 105 which is bifurcated at its lower end (see Fig. 8) and is provided with a cross-pin 106 which extends into an operating groove in the upper end of the associated valve spool, similar to the pin arrangement 98—99, above described in connection with the operation of Fig. 10.

As clearly seen particularly by reference to Figs. 3, 7, 8 and 9, at its left hand end the arm 105 has as an integrally formed part thereof a pair of downwardly extending laterally spaced plates or webs 107 which are also pivoted to the pin 101. Between these spaced plates 107 is a washer 108 carried on the pin 101 which acts as a spacer for a coil centering spring 109. The convolutions of spring 109 are wound around the washer 108 and the free ends thereof extend forwardly or to the right, as viewed in these figures of the drawings, the lower one, as viewed in Fig. 8 of the drawings, extending over an integral lug or abutment 110 which extends inwardly from the lower plate 107, as viewed in Fig. 8, and also over transversely extending pin 111 carried by the bracket 100 and extending between the two spaced apart arms thereof. The other or upper free end of the spring 109, as viewed in Fig. 8, extends forwardly below an integrally extending lug 112 formed on the upper plate 107 and also below the pin 111. The spring 109 is normally biased so that the free ends thereof exert opposing forces on opposite sides of the pin 111. As a consequence they tend to maintain the lever 105 in the neutral position which is illustrated in the drawings and movement thereof to either of the reverse operating positions will be counteracted by the spring 109 in an obvious manner, thus returning each of the spools in question to its normal position whenever the operating handle 102 is released.

The operating connection between the lever 105 and the handle 102 is a flexible one and provides for the progressive movement of the handle 102 in either of its reverse directions beyond that which is required to shift the spools such as spool 45. This connection includes an operating rod 113 housed within the handle 102 which is hollow, rod 113 having a head 114 on its outer end and threading into a head 115 on its inner end. The head 115 slides through an opening of an abutment ring 116 fastened to the inner walls of the opening in handle 102. Surrounding the rod 113 is a coil spring 117 normally under compression which abuts freely slidable washers 118 and 119 at its opposite ends, which washer 118 abuts a shoulder formed in the opening of handle 102 and which washer 119 abuts the ring 116. The head 115 is pivotally connected to a connecting link 120 which in turn is pivotally connected by a pivot pin 121 to the rear end of the spool operating lever 105.

During the first movement of the handle 102 from its normal position in either of its reverse directions, the spring 117 and its associated apparatus is without particular significance and the spool operating lever 105 moves as a unit with the handle 102. Further movement of the handle 102, however, in either direction will not produce any further movement of the spool operating lever 105 and this will be taken care of by compression of the spring 117 under the influence of the rod 113, the heads 114 and 115 and the washers 118 and 119, the spring 117 being compressed a progressively increasing amount as the handle is progressively moved beyond the spool acting position without regard to the direction of such movement.

As an incident to this further movement of the handle 102 in either of its reverse directions with the consequent compression of the spring 117, mechanism is brought into operation for adjusting progressively, and in accordance with the extent of movement of the handle 102, regardless of the direction of such movement, the pressure of the hydraulic fluid in the chamber 73 as determined by the pressure or relief valve 42. To this end the right hand web or plate 103 of each of the handles 102 is provided with a pair of downwardly extending radially spaced feet or legs 122. Each pair of feet or legs 122 straddles a roller 123 (see Figs. 3 and 5) there being five such rollers, all mounted on pivot pins on a pivoted bracket 124, the roller 123 being carried on upwardly extending bifurcated extensions 125 thereof (see Fig. 3). The bracket 124 is pivotally mounted on a pair of spaced brackets 126 (see Fig. 3) so that it can swing on a horizontal axis extending in front of the main valve assembly 43. The right hand end of the bracket 124 carries upper and lower rollers 127 which are mounted to roll on appropriate pivot pins and which abut a large head or disc 128 formed on the plunger 86.

The initial operation of the handle 102 to adjust the associated spool such as spool 45 does not produce any swinging movement of the bracket 124 since the legs 122 are radially spaced to provide for an abutting contact which takes place only following such valve spool shifting adjustment. Further movement, however, of the handle 102 in either direction will cause one of the legs 122 to abut the associated roller 123 and pivot the bracket 124 about its horizontal axis. This will cause one of the rollers 127 to move inwardly against the head 128 since one of them is above the axis of the pivotal bracket 124 and the other is equally spaced below it, thus forcing the plunger 86 inwardly from the position illustrated in Fig. 5 which is the position of minimum hydraulic pressure for the system. This minimum pressure may be selected at any desired value, as for example 50 pounds per square inch, and may be adjusted progressively in infinite steps upon progressive movement of the handle 102 until a desired maximum pressure is reached which, purely for illustration, may be 1200 pounds per square inch. It is thus obvious that when a selected spool, such as spool 45, is thrown from its neutral position to start rotation of the hydraulic motors, such as the motors 35, it will first start under a minimum predetermined torque which is determined by the pressure of the hydraulic fluid delivered thereto. If the operator desires to increase the torque he merely pushes further on the handle 102 and this is true whether he lifts it or pushes down on it or, in other words, regardless of the direction of operation of the hydraulic motors 35. Thus the operator can progressively increase the torque from the minimum starting value to any value within the range of the system.

From the foregoing it will be obvious that I have provided a hydraulic system and valve mechanism wherein the torque of driven motors, such as motors 31 and 35, may be adjusted starting from a minimum setting up to a maximum setting, as determined by the variable pressure in the hydraulic system under the control of valve 42, as previously described. In other words, this variable torque or variable force feature provided by adjusting the pressure of its hydraulic fluid is useful not only in connection with the driving wheels 28 and 29 but also in connection with the extension of the frame of the gathering head 19.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A hydraulic system including a pair of hydraulic motors, a source of hydraulic fluid under pressure, and means interconnecting said source and motors always in parallel including a pair of control valves, one of said valves being so constructed and arranged as to be operable in one position to connect said motors to operate simultaneously in a like manner and operable in another position to connect them to operate in an unlike manner, the other of said valves being operable in reverse directions to cause said motors to operate selectively as aforesaid and in reversible directions.

2. A hydraulic system including a pair of reversible hydraulic motors, a source of hydraulic fluid, and mechanism including control valve means connecting said motors in parallel and adjustable to operate said motors selectively in either the same or reverse directions relative to each other and also to reverse the direction of both together, said control valve means including a valve body having two independently operable slide valve members, one of said members being operable to different positions to provide passageways reversely connecting said motors relative to each other, said other member being operable to cause reverse travel of each motor when it is reversely operated from a neutral position in which it acts to lock said motors.

3. A hydraulic system including a pair of reversible hydraulic motors, a source of hydraulic fluid, and mechanism including control valve means adjustable to operate said motors selectively in either the same or reverse directions relative to each other and also to reverse the direction of both together, said control valve means including a valve body having two independently operable valve members, one of said members being operable to different positions to provide passageways reversely connecting said motors relative to each other but without connecting either to said source of fluid, said other member being operable to connect both of said motors simultaneously to said source of fluid and to cause reverse travel of each motor when it is reversely operated.

4. A hydraulic system including a pair of reversible hydraulic motors, a source of hydraulic fluid, and mechanism including control valve means adjustable to operate said motors selectively in either the same or reverse directions relative to each other and also to reverse the direction of both together, said control valve means including a valve body having two independently operable valve members, one of said members being operable to different positions to provide passageways reversely connecting said motors relative to each other, said other member being operable to connect both said motors simultaneously to said source of fluid and to cause reverse travel of each motor when it is reversely operated.

5. A hydraulic system including a pair of reversible hydraulic motors, a source of hydraulic fluid, and mechanism controllably interconnecting said source of fluid and said motors including control valve means adjustable to operate said motors selectively in either the same or reverse directions relative to each other and also to operate both together, said control valve means including a valve body having two independently operable valve members, one of said members being operable to different positions to provide passageways reversely connecting said motors relative to each other but without connecting either to said source of fluid, said other member being operable to connect both of said motors simultaneously to said source of fluid.

ARTHUR L. LEE.

REFERENCES CITED

The following references are of record in the file of this patent:

UNITED STATES PATENTS

| Number | Name | Date |
| --- | --- | --- |
| 1,156,816 | Rich | Oct. 12, 1915 |
| 1,743,367 | Maybach | Jan. 14, 1930 |
| 1,773,587 | Lape | Aug. 19, 1930 |
| 1,968,422 | Proctor et al. | July 31, 1934 |
| 2,060,220 | Kennedy | Nov. 10, 1936 |
| 2,103,274 | Sanford | Dec. 28, 1937 |
| 2,160,596 | LeBleu | May 30, 1939 |
| 2,220,479 | De Bell | Nov. 5, 1940 |
| 2,243,364 | Trautman | May 27, 1941 |
| 2,244,213 | Patton | June 3, 1941 |
| 2,272,091 | Loewe | Feb. 3, 1942 |
| 2,332,546 | Arentzen | Oct. 26, 1943 |
| 2,353,730 | Joy | July 18, 1944 |
| 2,362,262 | French | Nov. 7, 1944 |
| 2,374,714 | Turchan et al. | May 1, 1945 |
| 2,392,421 | Stephens | Jan. 8, 1946 |
| 2,461,116 | Jeffrey | Feb. 8, 1949 |